United States Patent
Gindele et al.

(10) Patent No.: US 8,150,120 B2
(45) Date of Patent: Apr. 3, 2012

(54) METHOD FOR DETERMINING A BOUNDING SURFACE FOR SEGMENTATION OF AN ANATOMICAL OBJECT OF INTEREST

(75) Inventors: Edward B. Gindele, Rochester, NY (US); Lawrence A. Ray, Rochester, NY (US); Richard A. Simon, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 594 days.

(21) Appl. No.: 12/341,000

(22) Filed: Dec. 22, 2008

(65) Prior Publication Data

US 2009/0279754 A1  Nov. 12, 2009

Related U.S. Application Data

(60) Provisional application No. 61/050,752, filed on May 6, 2008.

(51) Int. Cl.
*G06K 9/00* (2006.01)
*G06T 17/00* (2006.01)

(52) U.S. Cl. ........................... 382/128; 345/424
(58) Field of Classification Search .................. None
See application file for complete search history.

(56) References Cited

U.S. PATENT DOCUMENTS

| | | | |
|---|---|---|---|
| 6,385,332 B1 * | 5/2002 | Zahalka et al. | 382/128 |
| 6,542,153 B1 | 4/2003 | Liu et al. | |
| 7,773,791 B2 * | 8/2010 | Simon et al. | 382/128 |
| 2009/0129673 A1 * | 5/2009 | Simon et al. | 382/173 |
| 2010/0088644 A1 * | 4/2010 | Dowson et al. | 715/837 |

FOREIGN PATENT DOCUMENTS

WO    WO 2008/035266    3/2008

OTHER PUBLICATIONS

Cohen et al.: "*Global Minimum for Active Contour Models: A Minimal Path Approach*," International Journal of Computer Vision, vol. 24, No. 1, pp. 57-78, Aug. 1997.
Sun et al.: "*Computation of Minimum-Volume Covering Ellipsoids*," Operations Research, vol. 52, No. 5, pp. 690-706, Sep.-Oct. 2004.
Igarashi et al.: "*Teddy: A Sketching Interface for 3D Freeform Design*," SigGraph 99 article.
Digital Imaging and Communications in Medicine PS 3.3—*Standards Manual*, National Electrical Manufacturers Association, 1999 (http://www.nema.org/stds).

(Continued)

*Primary Examiner* — Vinh Nguyen (57) ABSTRACT

A method of bounding an anatomical object of interest in a 3-dimensional volume image includes displaying an image of at least a portion of the object, selecting a plurality of points in the displayed image, at least a first and second point of the plurality of points spanning the object, forming a non-rectilinear surface bounding the plurality of points, identifying a seed point within the surface and extracting a plurality of statistical values corresponding to image voxels disposed proximate the seed point, and classifying image voxels within the surface into a first class and a second class based on the plurality of statistical values.

20 Claims, 9 Drawing Sheets

OTHER PUBLICATIONS

Commonly assigned U.S. Appl. No. 61/050,723, entitled "Statistics Collection for Lesion Segmentation", provisionally filed on May 6, 2008.

Commonly assigned U.S. Appl. No. 61/050,736, entitled "Method for Editing 3D Image Segmentation Maps", provisionally filed on May 6, 2008.

John Damilakis et al., "Broadband ultrasound attenuation imaging: algorithm development and clinical assessment of a region growing technique," Physics in Medicine and Biology, vol. 27, No. 2, Jan. 2, 2002, pp. 315-325, XP002493537.

Prashant Bansod, et al., "Multi Frame Guided Local Search for Semiautomatic Endocardial Contour Estimation in Echocardiography Sequences," Information, Communications & Signal Processing, 2007 6th International Conference, Dec. 10, 2007, pp. 1-5, XP031229360.

* cited by examiner

METHOD FOR DETERMINING A BOUNDING SURFACE FOR SEGMENTATION OF AN ANATOMICAL OBJECT OF INTEREST

CROSS REFERENCE TO RELATED APPLICATIONS

Priority is claimed from U.S. Ser. No. 61/050,752, provisionally filed on May 6, 2008, entitled "METHOD FOR INTERACTIVELY DETERMINING A BOUNDING SURFACE FOR SEGMENTING A LEDION IN A MEDICAL IMAGE", in the name of Edward B. Gindele et al., commonly assigned and incorporated herein by reference.

FIELD OF THE INVENTION

The present invention relates to the field of digital imaging, and more particularly to segmenting a lesion in a digital medical image.

BACKGROUND OF THE INVENTION

Image segmentation is a branch of digital image processing that performs the task of categorizing, or classifying, the elements of a digital image into one or more class types. For medical imaging applications, it is common that image segmentation is performed on the voxels (volume elements) of a 3-dimensional image data set with the classification types related to anatomical structure. One task is segmenting regions within the image data set that are considered as cancerous or diseased tissue. This capability enables physicians and radiologists to diagnosis, to plan treatment, and to assess the progress of treatment in a rapid and perhaps more effective manner than a manual process.

Several systems and/or methods for segmenting diseased tissue on a PACS (Picture Archive and Communication System) are known. Such systems and/or methods initiate segmentation by having the physician point to the location of the diseased tissue using a pointing device such as a mouse. The pointing is achieved by a click of one of the buttons on the mouse. A segmentation algorithm is launched, resulting in the outline and/or three-dimensional rendering of the volume of diseased tissue being identified. Subsequently, the result of the segmentation maybe drawn for the user and the volume of the segmented is reported.

A typical image segmentation strategy is generally known as "region growing." Starting with a seed point (i.e., a voxel position that is known to be part of a particular class type), a region of contiguous voxels is grown, or expanded about the seed point. The region growing process progresses until a stopping condition is satisfied, e.g., no more contiguous voxels are found, or a predetermined number of voxels have been visited, etc. Often the stopping conditions are based upon a threshold condition. Such a condition is the voxels have a signal value (e.g., Hounsfield units for CT) greater than the threshold. The region continues to expand as long as the adjoining voxels comply with the threshold condition. In some cases, this simple stopping condition leads to unconstrained growth, as the signal values of diseased tissue and healthy tissue are similar. This results in additional constraints, such as maximum distance away from the initial seed point.

An approach to form a bounding box is for the user to input two or more points and a rectilinear volume is specified by the minimum and maximum coordinates of the points in each dimension. The resulting eight points form the vertices of the rectilinear volume. The box is defined as a set of voxels $v=(v_1, v_2, v_3)$ with the property that $|v_1-c_1|\leq d_1$, $|v_2-c_2|\leq d_2$ and $|v_3-c_3|\leq d_3$ where $c=(c_1, c_2, c_3)$ is the center of the bounding box and $d=(d_1, d_2, d_3)$ is half of the width, length and height of the box. This has the advantage of being simple to implement and the bounds check is also trivial. Unfortunately, the approach results in many voxels that could be readily ignored, and the boundary of the box does not reflect anatomical shapes, which are generally smooth without sharp rectilinear corners.

An approach to reporting the size of the diseased tissue is given by the Response Evaluation Criteria In Solid Tumors (RECIST) method. In such a method, a physician first identifies the slice in the medical image, e.g., computed tomographic exam, having the largest cross-section. Then within that slice two points are identified forming the longest section across the diseased tissue. The length of the line is commonly referred as the diameter of the diseased tissue, or more often as the size of the diseased tissue. It is understood that this measure is not precise, as many regions of diseased tissue are not spherical and the longest diameter may also not be within a single axial slice.

It is known that a human has unexcelled capability to interpret visual information, even when the information is obscured or ambiguous. The advantage of semi-automatic systems, i.e., systems that use both human and machine capabilities, is that the relative strengths of humans and machines are utilized. Limited information about the diseased tissue, such as the location of diseased tissue, or a bounding box containing the diseased tissue, is often easier and more dependable for the human to provide than the machine. However, identifying all the voxels within the diseased tissue is tedious and often accomplished better by machine. The human is also able to determine nuances that alter a preferred strategy for achieving a desired outcome and these are often difficult for a machine to perform.

While the automatic sizing approach with a single point will produce useful results, it may still be difficult to distinguish between diseased and normal tissues having the same signal levels within the examination type, e.g., computed tomography. A bounding box is a means to address this problem. Since diseased tissue's morphology can be irregular the ability to discern the boundary of the diseased and normal tissue depends upon the intelligence incorporated into the segmentation algorithm.

However, diseased tissue tends to grow from a small region or point. The growth of the disease tends to be more spherical than rectilinear. Thus, there is a need for is a fast and convenient way for a radiologist to input more useful information to a segmentation algorithm that is consistent with morphology of diseased tissue growth. For example, while a single position of the diseased tissue is a minimal interaction, there are cases, as previously described, where a single point does not yield satisfactory results. Often by providing slightly more initial data to the algorithm, the problem can be reduced or eliminated.

SUMMARY OF THE INVENTION

In an exemplary embodiment of the present disclosure, a method of bounding an anatomical object of interest in a 3-dimensional volume image includes displaying an image of at least a portion of the object, selecting a plurality of points in the displayed image, at least a first and second point of the plurality of points spanning the object, forming a non-rectilinear surface bounding the plurality of points, identifying a seed point within the surface and extracting a plurality of statistical values corresponding to image voxels disposed proximate the seed point, and classifying image voxels within the surface into a first class and a second class based on the plurality of statistical values. The method also includes extracting a plurality of voxel values corresponding to voxels disposed proximate the seed point, and dividing voxels within the surface into a first class and a second class based on the plurality of voxel values. In such an embodiment, the surface is one of spherical and elliptical, the seed point is located at a midpoint between the first and second points, and the surface is centered about the seed point. In such a method, the plurality of points further includes a third point and a fourth point, the third and fourth points spanning the object. In addition, at least three of the first, second, third, and fourth points lie on the surface, and at least three of the first, second, third, and fourth points are coplanar. In such a method, a line segment connecting the first and second points approximates a maximum length of the object, and a line segment connecting the third and fourth points approximates a maximum width of the object. In addition, the plurality of points further includes a fifth point and a sixth point, the fifth and sixth points spanning the object. Such an exemplary method further includes calculating a set of noise-filtered voxel values corresponding to the image voxels within the surface, and classifying the image voxels within the surface into the first and second classes based on the set of noise-filtered voxel values.

In another exemplary embodiment of the present disclosure, a method of bounding an anatomical object of interest in a 3-dimensional volume image, includes displaying an image of at least a portion of the object, selecting a first and second pair of points in the displayed image, the first pair and the second pair spanning the object, and forming an ellipsoid bounding the first pair and the second pair. The method also includes identifying a seed point within the ellipsoid and extracting a plurality of statistical values corresponding to image voxels disposed proximate the seed point, and classifying image voxels within the ellipsoid into a first class and a second class based on the plurality of statistical values. In such an exemplary method, the ellipsoid is an ellipsoid of revolution. Such an exemplary method further includes selecting a third pair of points in the displayed image, the third pair spanning the object. In such an exemplary method, the ellipsoid is a minimal volume ellipsoid containing the first, second, and third pairs of points. In the above exemplary method, at least one pair of the first, second, and third pairs of points lies in a different plane than the remaining pairs of points. In addition, a line segment connecting the first pair of points approximates a maximum length of the object, a line segment connecting the second pair of points approximates a maximum width of the object, and a line segment connecting the third pair of points approximates a maximum height of the object. In such an exemplary method, classifying the image voxels within the ellipsoid comprises comparing image voxel values corresponding to the image voxels within the ellipsoid to a mean statistical value In a further exemplary embodiment of the present disclosure, a method of bounding an anatomical object of interest in a 3-dimensional volume image includes displaying an image of at least a portion of the object, selecting a first and second pair of points in the displayed image, the first pair and the second pair spanning the object, forming a minimum area ellipse bounding the first pair and the second pair in response to the selection of the first pair and the second pair, identifying a seed point within the ellipse and extracting a plurality of statistical values corresponding to voxels disposed proximate the seed point, and classifying voxels within the ellipse into a first class and a second class based on the plurality of statistical values. In such an exemplary embodiment, the object is a lesion.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Exemplary embodiments of the present disclosure provide the operator of a PACS medical imaging diagnostic workstation the ability to segment anatomical regions of interest in digital medical images with a limited amount of input. The input addresses the knowledge of the user to identify the object of interest and to give some rudimentary control over the location, extent, orientation, and shape of the object. The volume of interest generated is compatible with anatomical objects. For example, in an embodiment of the present disclosure, the boundary of the volume of interest may not possess sharp corners or edges. Moreover, the test whether a voxel is interior or exterior to the volume is simple to implement.

Reference is made to commonly assigned application U.S. Ser. No. 61/050,723, entitled "STATISTICS COLLECTION FOR LESION SEGMENTATION", provisionally filed on May 6, 2008, the entire disclosure of which is incorporated herein by reference.

Reference is also made to commonly assigned application U.S. Ser. No. 61/050,736, entitled "METHOD FOR EDITING 3D IMAGE SEGMENTATION MAPS", provisionally filed on May 6, 2008, the entire disclosure of which is incorporated herein by reference.

Many medical imaging applications are implemented via a PACS. These systems provide a way for displaying digital images acquired by a wide variety of medical imaging modalities such as, but not limited to, projection radiography (x-ray images), computed tomography (CT images), ultrasound (US images), and magnetic resonance (MR images). Each of the above mentioned medical imaging modalities contain slightly different diagnostic information. In particular, CT and MR images, when viewed and studied by a radiologist, can reveal much detail about a patient's 3-dimensional internal anatomy. Computer algorithm technology can also be applied to medical images to enhance the rendering of the diagnostic information, to detect an abnormal condition, i.e., computer aided detection (CAD), and to make measurements relating to the patient's condition, i.e., computer aided measurement (CAM).

Exemplary methods of the present disclosure may employ a computer algorithm for segmenting a portion of a medical image with anatomical relevance. In an exemplary embodiment, the methods described herein may be used for the segmentation of abnormal pulmonary lesion tissue from normal tissue. In such an embodiment, a user of the PACS system, usually a radiologist may review a thoracic CT exam on a medical PACS and may indicate to the CAM segmentation software the position and orientation of a suspected pulmonary lesion. Typically, the user supplies two point locations associated with the suspected lesion while viewing an axial slice of the CT exam. Optionally, the user can supply more than two points within the exam. The voxel positions indicated by the user can be located near, but not necessarily exactly on or within, the boundary of the pulmonary lesion. Alternatively, the user can supply two points, one or both of which are wholly within the lesion tissue region. The CAM segmentation software embodying the technology of the present disclosure may then identify voxels that are part of the pulmonary lesion, i.e., a segmentation of the lesion tissue is performed. Once the region associated with the pulmonary lesion has been segmented features of the lesion can be quantified analytically such as the corresponding volumetric size.

Although exemplary embodiments of the present disclosure may be described as a software program, those skilled in the art will readily recognize that the equivalent of such software can also be constructed in hardware.

Figure 1:
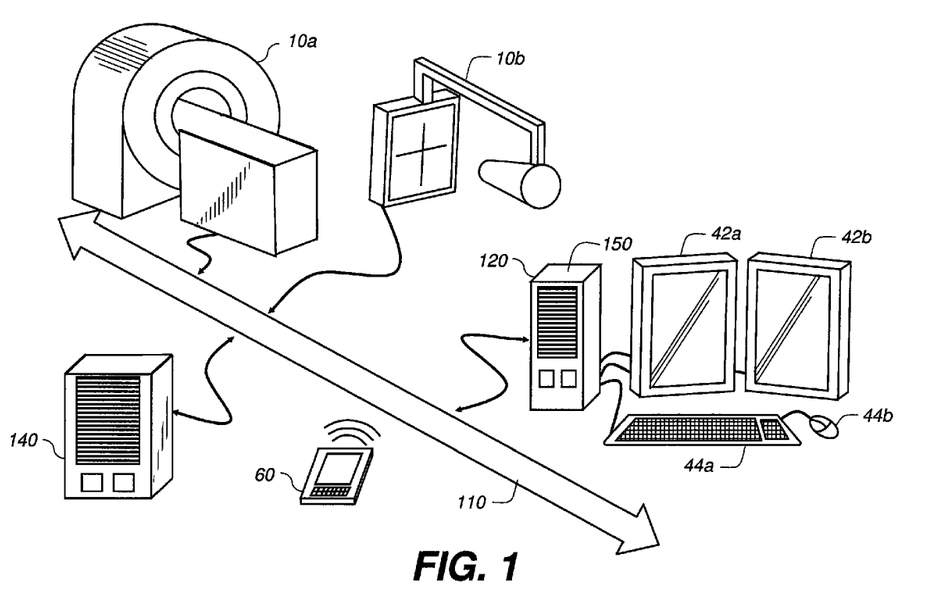
FIG. 1 is a diagram showing a medical imaging communications network of connected computers suitable for practicing embodiments of the present disclosure.

FIG. 1 shows a medical imaging communications network that includes multiple connected computers. Such a network of computers provides a way of sending and receiving information between any two or more connected computers. Medical digital images may be generated by imaging a patient (not shown) with an image capture device. An image capture device 10a symbolically represents a number of medical digital image modality devices such as, but not limited to, a computed tomography scanning device (CT) or Magnetic Resonance imaging scanning device (MR) that are capable of producing 3-dimensional digital images of patient anatomy.

A patient may be positioned on a movable table within the capture device assembly such that the patient can be moved relative to the signal source of the capture device. The capture device receives the signals that have passed through the patient in raw form, processes these signals, and produces a slice digital image. Each slice digital image represents a cross section, or slice, through the patient anatomy. Repositioning the patient relative to the source signal and acquiring other slice digital images can generate a slice image series. Typically, this is done by placing the patient on a bed that can be moved relative to the imaging apparatus. A slice image series, assembled in proper order, can represent the full 3-dimensional volume of an imaged patient.

Also connected to a communications network 110 is a digital radiographic (DR) capture device 10b capable of producing digital x-ray images. As such, the images produced by a DR capture device typically are one or more 2-dimensional digital images each representing a different exposure and/or imaging path through the patient. For example, the DR capture device 10b can be used to acquire multiple projection radiographic digital images with its x-ray source located in different positions relative to the patient. The resulting DR radiographic digital images can be processed to produce a set of tomosynthesis slice digital images that represent a 3-dimensional digital image of the patient.

The slice digital images (not shown) produced by the capture device 10a are transmitted via the communications network 110 to an image archive computer 140 where, along with patient history information, they become part of an electronic patient history record. The main function performed by the image archive computer 140 is the facilitation of transfer or exchange of image information rather than the processing of information. The image archive computer 140 serves as a large storage repository of digital images and other, but unspecified, medical information. The arrows in the diagram of FIG. 1 represent the exchange of information, which in general, is bi-directional i.e.; the flow of information can be in either direction.

The slice images are later queried on a diagnostic workstation computer 120, sometimes referred to as a PACS, for viewing and examination by a radiologist or similarly trained medical professional. The diagnostic workstation computer 120 can have multiple electronic displays connected for viewing medical images. Two such electronic display devices 42a and 42b are shown in FIG. 1. Also connected to the diagnostic workstation computer 120 are input devices 44a and 44b depicted here as keyboard and mouse devices, respectively. Although embodiments of the present disclosure may be operable, within the context of a diagnostic workstation computer, it should be noted that any computing device capable of displaying and processing image data might be used. For example, a mobile computer 60 shown in FIG. 1 can be used with the present invention. Thus it is not necessary for the computer to be physically connected to the communications network 110.

A PACS can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but is not limited to, non-image information (meta-data) such as age, sex, medical history, prescribed medications, symptoms, etc.

For the purposes of this disclosure the collection of interconnected computers including the communications network will be also be referred to as a "DICOM" network since DICOM (Digital Imaging and Communications in Medicine PS 3.3-1999, National Electrical Manufacturers Association, 1999) formatted digital images are currently the industry standard and the most prevalent file encoding used for medical digital images. Typically a 3-dimensional volume image is constructed from set of 2-dimensional slice digital images wherein each slice digital image is encoded as an individual DICOM file.

Often an individual digital image data element, i.e., single value representing measured image signal intensity, is referred to as a voxel for 3-dimensional images and a pixel for 2-dimensional images. The term "voxel" is commonly used to characterize a volume-element whereas the term "pixel" is commonly used to characterize a picture-element. Embodiments of the present disclosure can be applied to 2-dimensional and 3-dimensional images. As such, for the purposes of the present disclosure, the terms voxel and pixel should be considered interchangeable, i.e., describing an image elemental datum capable of having a range of numerical values. Voxel and pixels can be said to have the attributes both of location and value.

With the medical imaging system setup as described above and shown in FIG. 1, a medical professional, such as a radiologist, uses the keyboard 441a or mouse 44b to indicate to a software application program 150, running on the diagnostic workstation computer 120, the desired patient record to be loaded into memory. The CT digital image exam, i.e., the set of CT slice digital images, is then retrieved from the image archive computer 140 and displayed on the electronic display devices 42a and 42b. After viewing the image data, the medical professional indicates to the system the location of a suspected pulmonary lesion with a click of the mouse, input device 44b. Typically, this is performed by sequentially scrolling through the 2-dimensional slices digital images and selecting the slice digital image that best shows the suspected pulmonary lesion.

Embodiments of the present disclosure may be used for the purpose of collecting statistical information regarding an anatomical region or object of interest, such as lesion tissue, i.e., localized abnormal tissue regions. However, a localized anatomical region or object of interest within a set of medical diagnostic digital images can serve as the focus region of the collection of statistical information. For example, an anatomical region or object of interest could be an entire organ such as the liver.

The statistical collection technology described herein may be used in conjunction with a computer graphical user interface (GUI). The Microsoft Windows operation system was used to develop the prototype for this technology. However, those skilled in the art will recognize that the embodiments described herein can be used with any other computer operation system that allows the user to interact with digital images and allows the users to select points with an input device.

In an exemplary embodiment of the present disclosure, a user of the system views a digital medical image exam, such as a CT exam, on the electronic displays device 42a and/or 42a shown in FIG. 1. The user then identifies a region or object of interest by scrolling through the slices of the CT exam while viewing one of, but not limited to, the following: an axial, coronal, or sagittal slice. The user can also view the digital image representation as a multi-planar reconstruction, which is essentially an interpolated view of the CT data that is constructed at an arbitrary orientation with respect to the axial, coronal, and sagittal views.

The user activates the segmentation algorithm by pressing a menu option or button on the GUI that places the software in "segment-a-lesion" mode. The software may wait for the user to make a selection of two points. Several methods were used in experimentation, and an exemplary method for selecting the two points is the click and drag method. In this setup, the user selects a first point (shown as point 202 of FIG. 2) by clicking and holding down a button of a mouse shown as input control device 44b in FIG. 1. Then the user moves the mouse to the location of the second selected point (shown as point 203 of FIG. 2) and releases the mouse button. The software of the GUI receives these mouse events, i.e. the mouse click down and mouse release up events, and records the screen locations corresponding to these events. The screen locations for each selected point are then translated into a corresponding point location within the CT exam voxel data.

In addition, while the user is moving the mouse (and holding the mouse button down), the software draws a line between the first selected point and the current location of the mouse. The software also displays the length of the line in real world units. The scaling coefficients needed to convert the length of the line from voxel units to real world units are obtained by reading information stored in the DICOM header information accompanying the CT voxel data.

Alternatively, the user interface for the selection of multiple points can be constructed by allowing the user to click and release the mouse button once for each selected point. For this interface, the user may press a different button on the GUI to indicate that the selection of points is completed.

In clinical practice, radiologists often report the size of the lesion by using a measured line. The RECIST criterion is typically used as a guideline for this measurement operation. Radiologists are accustomed to using point and click devices within the context of a PACS to draw a line between two selected points on the boundary of a lesion. Typically, the radiologist selects the axial slice for which the lesion presents the largest cross-sectional area (judged by visual inspection) and selects two points that represent the linear diameter of the lesion within that slice. Optionally, the radiologist can also choose to measure the cross diameter of the lesion, i.e. the largest diameter draw to the boundary of the lesion and perpendicular to the primary (longest) previously drawn. These two measures are sometimes added to give a measure that accounts for the lesion not being circular in an axial slice.

Figure 2:
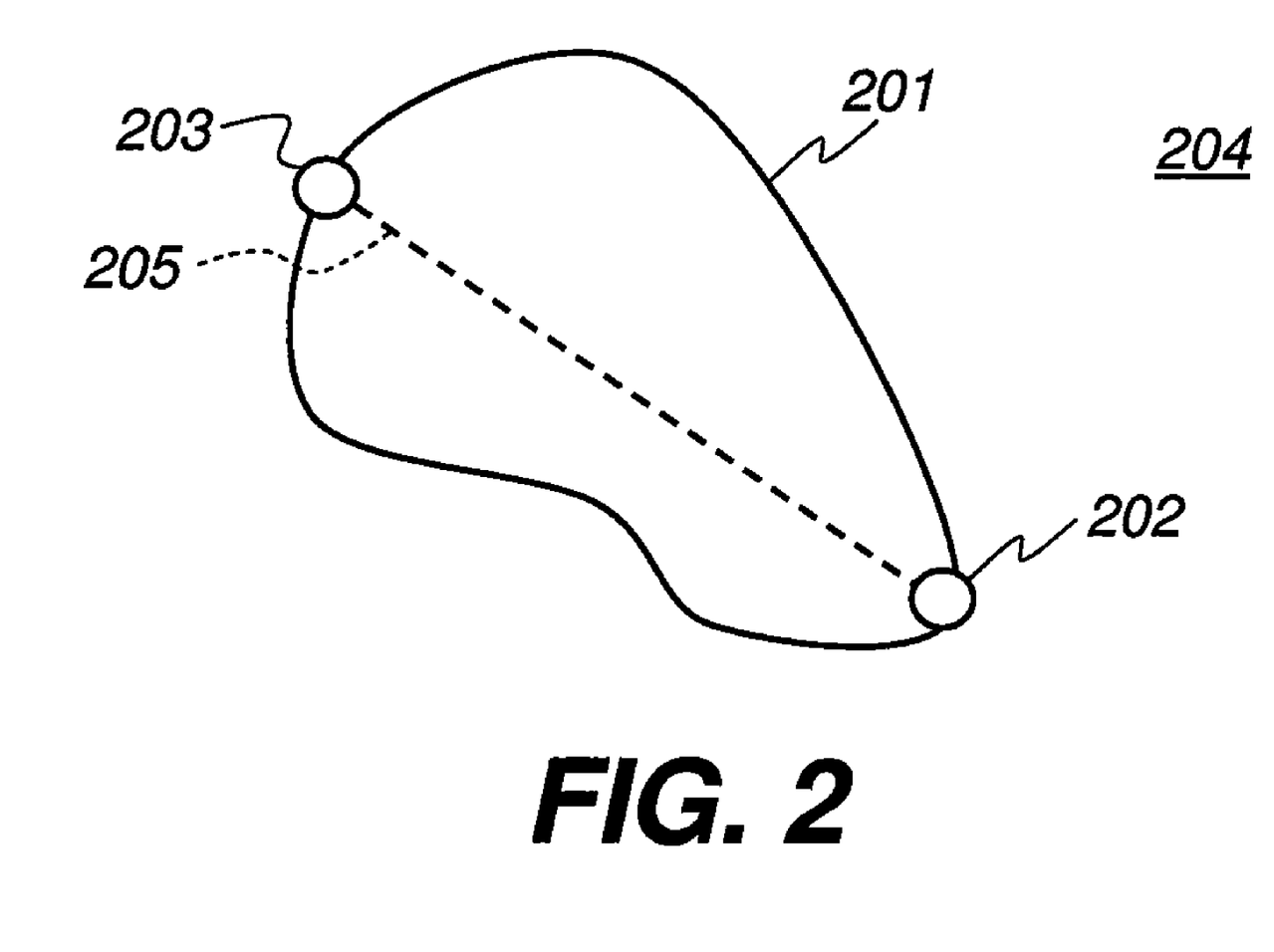
FIG. 2 is a diagram illustrating a lesion, its surrounding background, two selected points on a boundary, and a line drawn between the two points.

FIG. 2 depicts a typical use case scenario. Points 202 and 203 have been selected by the user to correspond to the identified anatomical region of interest, i.e., lesion 201. Note that points 202 and 203 are located on the boundary between the lesion 201 and the background region 204 that surrounds the lesion. The user of the system is instructed to choose two points that span lesion.

Exemplary embodiments of the present disclosure are described in the context of an image segmentation application. Such embodiments solve the problem of collecting statistical information that relates to a region or object of interest within a volumetric computed tomography (CT) exam. In particular, several numerical quantities relate to a tissue type spanning a geometric region of the image. For example, the mean voxel value, given in Hounsfield units (HU), tends to be a characteristic of a tissue type. The standard deviation of voxel values for a tissue type can be both a characteristic of the tissue type and/or indicative of the noise of the capture system. Both the mean and standard deviation of voxel values for the region associated with a lesion can be of help in the segmentation process of automatically identifying each voxel in the exam as either belonging to a lesion tissue region or belonging to the background or some other anatomical structure.

Referring to FIG. 2, lesion region 201 is shown as a geometric region. Two points span an anatomical region of interest when there exists voxels between the two points corresponding to the anatomical region of interest providing data for meaningful statistics. If the user selects points and the connecting line segment does not intersect the anatomical region of interest, then the statistics may not be meaningful. Also, if the user selects points that are extremely close, then the statistics may not be meaningful, as the number of samples is too small. In an exemplary embodiment, the points may be selected such that most of the voxels that lie along a line between the two selected points are part of the anatomical region of interest. Points 202 and 203 are an example of two points that span the lesion 201. In this particular case, points 202 and 203 lie on the boundary of the lesion tissue region and the background region 204.

For the two selected points shown in FIG. 2, statistical information relating to just the imaged lesion tissue can be collected by evaluating the voxels that lie along a theoretical line drawn between them shown as dotted line 205. This is the simple case of statistical information collection since the two selected points 201 and 202 lie on the boundary between the lesion region 201 and background region 204. However, embodiments of the present disclosure can also be used when the two selected points do not lie on the boundary between tissue regions.

Figure 3:
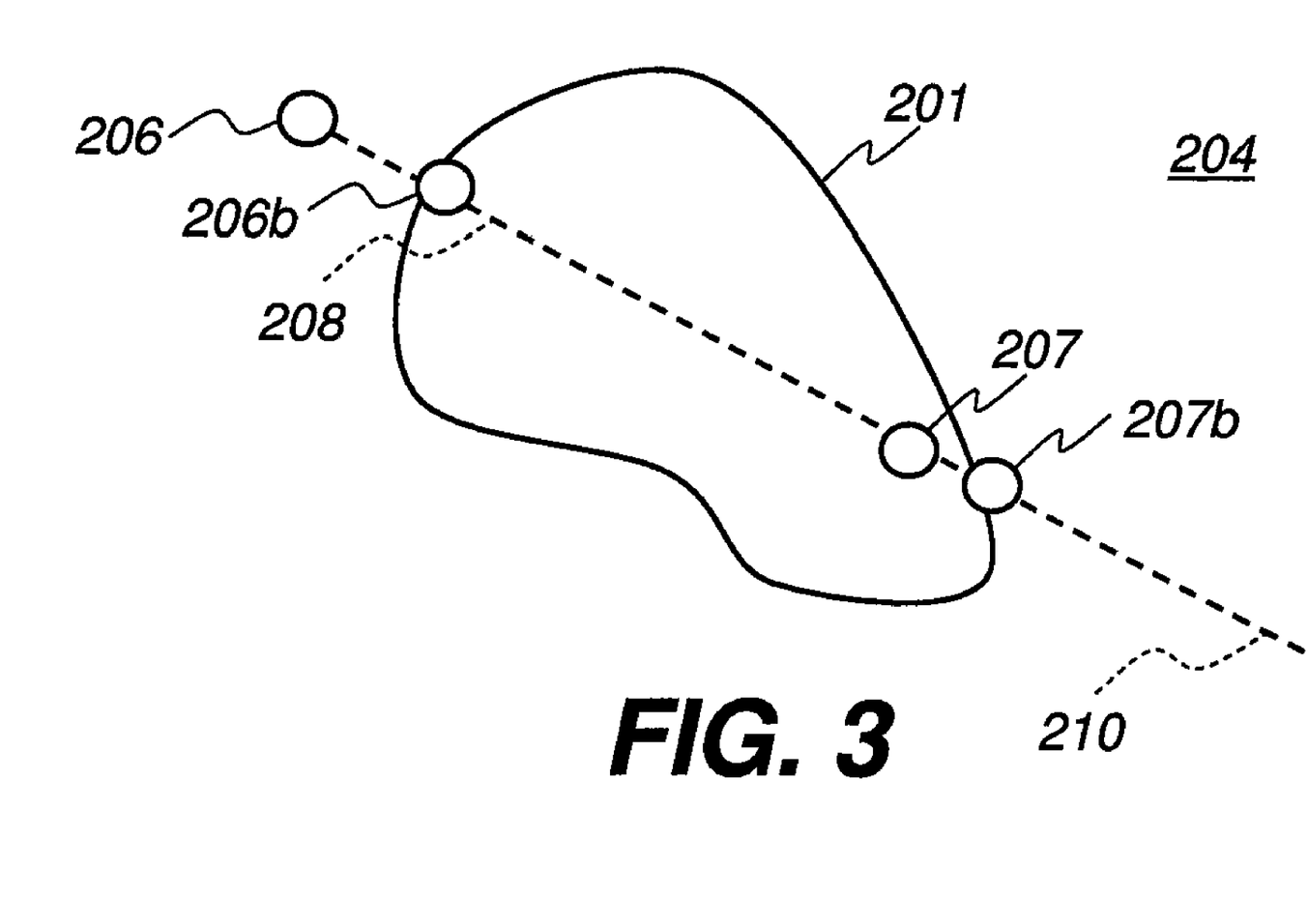
FIG. 3 is a diagram that shows lines extending from the two selected points.

FIG. 3 shows points 206 and 207 that are two different points that span lesion region 201. Note that point 206 does not lie on the boundary between lesion tissue region 201 and the background region 204, but is located entirely in the background region 204. Point 207 lies within lesion region 201. However, these two points also span the lesion region 201 because the voxels that lie along dotted line segment 208 between points 206 and 207 are associated with the lesion region 201.

An embodiment of the present disclosure uses spatial operators applied to the voxel image data to determine boundary points that lie along the line that connects the two selected points. Let the set of n voxel values that correspond to sequential locations ordered from the first selected point to the second selected point be represented by the sequence:

$$A = \{a_1, a_2, \ldots, a_n\}.$$

The differential signal D, i.e. another set of sequential voxel values, can be constructed wherein each element of D is calculated by taking the difference of sequential elements of A:

$$D = \{d_1, d_2, \ldots, d_{n-1}\},$$

where $$dj = \{a_j - a_{j-1}\}.$$

It can be assumed that a difference in mean voxel value exists between the lesion region 201 and background region 204. For the case shown in FIG. 3, the voxel values in the immediate vicinity of selected point 206 will have values with an expected mean value corresponding to the background region 204. As points are evaluated in the sequence of values in the differential signal D, one or more of the values in the differential signal D will have a magnitude that exceeds a threshold T at corresponding locations to the boundary between the lesion region 201 and background region 204. The voxel location of such a condition in the differential signal D is shown as point 206b in FIG. 3.

Noise in the voxel values can produce spurious calculations for the location of the boundary between lesion tissue and background tissue. Noise filtering algorithms such as a median filter can be applied to the voxel image data prior to the calculation of boundary points. In addition, all subsequent processing, such as the segmentation processing, can be performed on the noise filtered voxel data instead of the original voxel data.

Point 207 shown in FIG. 3 lies within the lesion region 201. There is no appreciable differential signal, i.e. a differential signal D that is greater than the threshold value T, in the immediate vicinity of point 207. When this condition occurs, the selected point is assumed to be an interior lesion point. Boundary point 207b is calculated by extending a line (line 210) collinear with line 208. The differential signal D is then evaluated along line 210 to determine the boundary point.

A typical value for the threshold value T varies based on the expected mean value between the lesion tissue and background tissue. When segmenting pulmonary lesions, a reasonable value for the threshold may be approximately 150 HU. While segmenting liver lesions, a reasonable value for the threshold T may be approximately 20 HU. Threshold values for other types of anatomical regions of interest can also be found by experimenting with CT exam data.

When the anatomical region of interest is not known a priori the threshold value T may be calculated from the voxel data. Line 208 can be extended in both directions and a corresponding differential signal is calculated using points sampled along the extended line. A noise filter is first applied to the voxel data as described above, and all subsequent calculations are performed on the noise filtered voxel data. Using sampled voxel values that lie between the two selected points, a median voxel value is found. Using the median value helps to reject any boundary transitions that occur along the line if one of the two selected points was an exterior point. The median value is then taken as the characteristic value for the lesion region. The standard deviation of voxel values sampled along the line between the two selected points is then used to determine two threshold values, i.e. a $T_{high}$ and $T_{low}$. An exemplary method for calculating the value of $T_{high}$ is the median value plus two standard deviation units. The value of $T_{low}$ is calculated as the median value minus two standard deviation units.

Thus, the two selected points that span a lesion can be chosen to be either inside or outside the lesion tissue region or can be chosen to be on the boundary between the lesion tissue region and the background tissue region. This flexibility accounts for users of the system who are not always precise when selecting points. For example, when radiologists select two points to measure the diameter of a lesion there is often variability in the measured diameter outcome when different observers measure the same lesion. This is due to a variety of factors. For example, the boundary between lesion and background tissues can be exhibited over not just one voxel but 2 or 3 voxels. Not all observers agree on the exact location of the boundary. Also a confusing factor adding to the variability of such measurements is the fact that many observers prefer to perform lesion diameter measurements while viewing the lesion at a relatively low magnification factor. This causes variability due to the coarseness' of the visual presentation of the lesion.

In an alternative embodiment, the spatial operator is not applied to the voxel image data prior to the collection of statistical information. An inner fraction of the linear distance between the two selected points is used as the set of voxels from which to collect statistics. Typically an inner fraction of 50% yields good results in practice.

The two selected points define the equation of a line. This line is an example of a path, in this case a straight line, defined by the selected two points. Voxel data values are sampled along the line between the two selected points. However, other paths defined by two points can also be used as a basis for sampling the local voxel values. For example, Gohen and Kimmel describe a method for defining a path of minimum gradient in the journal article "Global Minimum for Active Contour Models: A Minimal Path Approach", International Journal of Computer Vision, vol. 24, no. 1 pp. 57-78, August 1997.

Exemplary embodiments of the present disclosure can be used with selected points that lie near but not necessarily on the boundary between lesion and background tissues. Statistics associated with just the lesion region can be collected. As discussed above, the mean value for lesions can vary substantially while the mean voxel value for background tissues is expected to fall within well prescribed ranges. For the case of pulmonary lesions, the expected mean voxel value for the lung parenchyma tissue as background may range between approximately −950 and approximately −850 HU. The mean voxel value associated with lesion tissue can range between approximately −500 and approximately +1500 HU.

Along with the mean voxel value, the minimum, maximum, and standard deviation of voxel values associated with the lesion tissue is also calculated. A threshold value $\tau_{low}$ and $\tau_{high}$ are calculated. The threshold value $\tau_{low}$ may be set to a value that is two standard deviation units below the minimum lesion sampled value. The threshold value $\tau_{high}$ may be set to a value that is two standard deviation units above the maximum lesion sample value. The lesion region can then be segmented by finding all voxel values that lie between the two threshold values value $\tau_{high}$ and $\tau_{high}$ resulting in a segmentation map.

Figure 4:
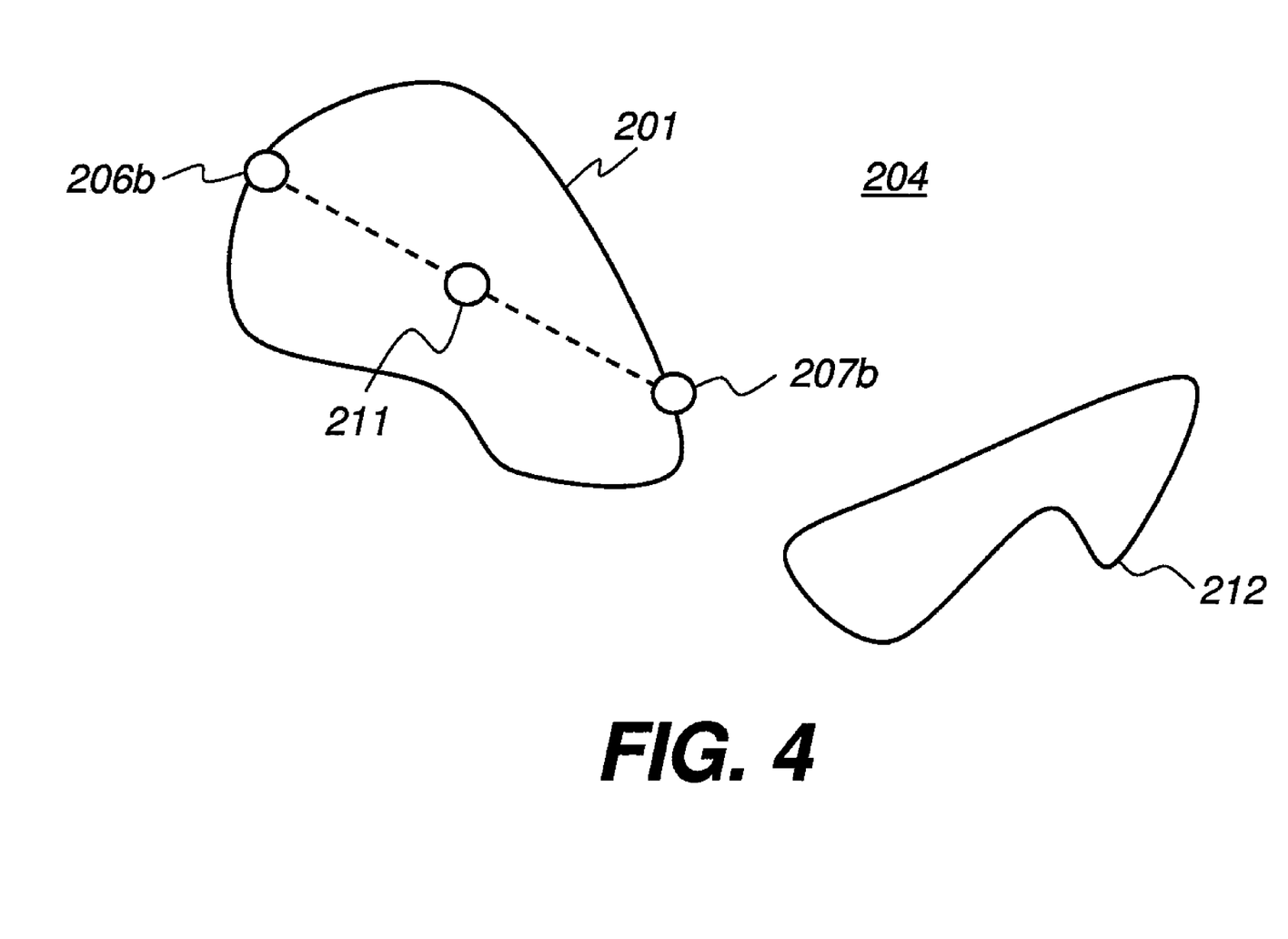
FIG. 4 is diagram that shows regions classified after a first pass segmentation processing step.

Many voxels not associated with the identified lesion can be accepted by the previously described operation. Such a region is shown in FIG. 4 as region 212. A connected component analysis is performed on the segmentation map using a seed value constructed as the mid-point 211 between the two points 206b and 207b shown in FIG. 4.

Figure 5:
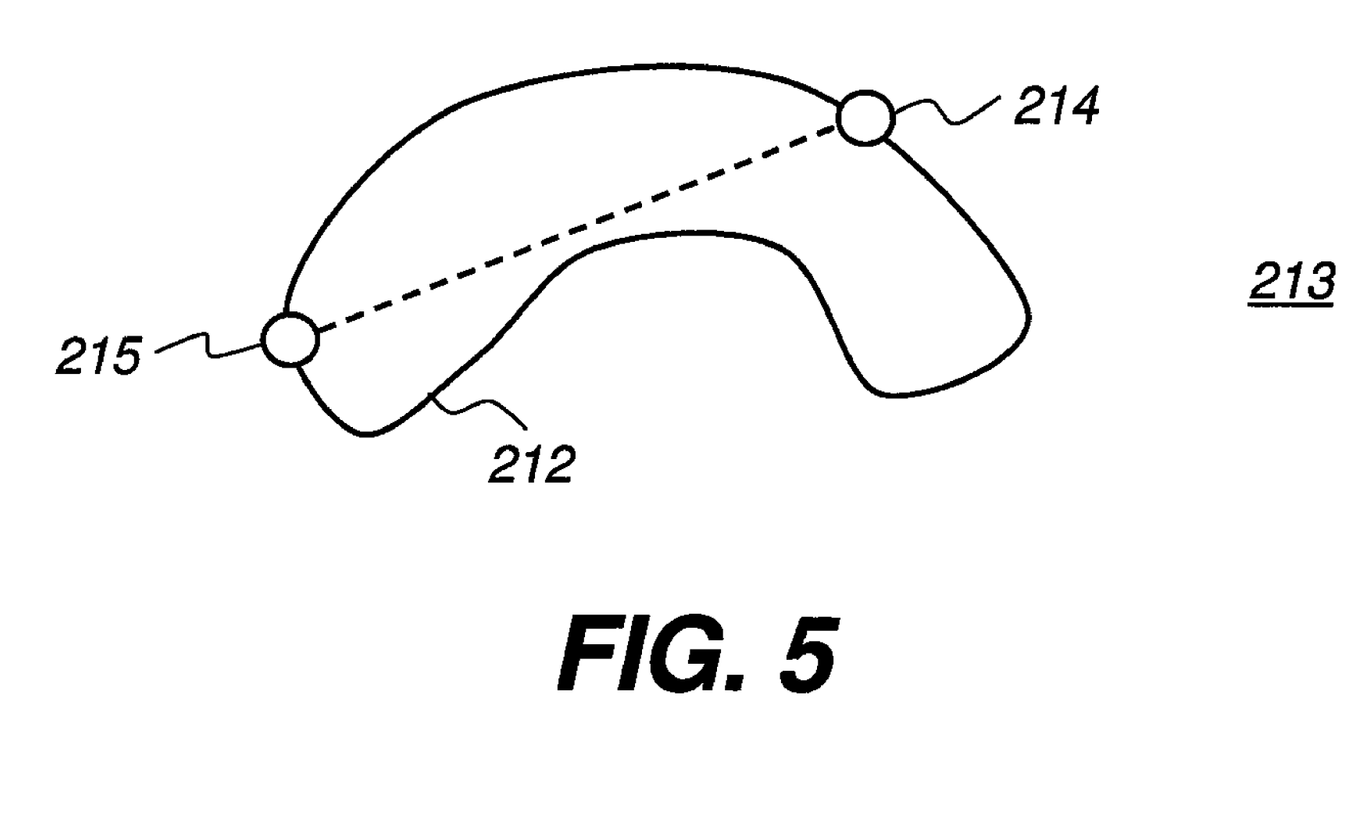
FIG. 5 is a diagram showing two selected points for an irregularly shaped anatomical region of interest.

FIG. 5 shows an example of an irregularly shaped lesion 212 and background region 213. For this type of lesion, points 214 and 215 can be selected to span the lesion. In such an exemplary embodiment, users of the system may be instructed to select points having the mid-point within the lesion.

The two selected points supplied by the user of the system may also be used to form a bounding surface that serves to limit the region of the first segmentation result. When just two points have been selected, a spherical surface is generated as the bounding surface centered on the mid-point between the two selected points. The final segmentation of the anatomical region or object of interest is generated by applying the bounding surface as a geometrical clipping constraint. That is, the voxels included in the final segmentation result are voxels that were included in the first segmentation result and that have locations that are either on or within the bounding surface. Thus, the two selected points are used to generate a bounding surface that defines a clipping domain. It should also be noted that a bounding circle can be drawn from the two selected points.

Figure 6:
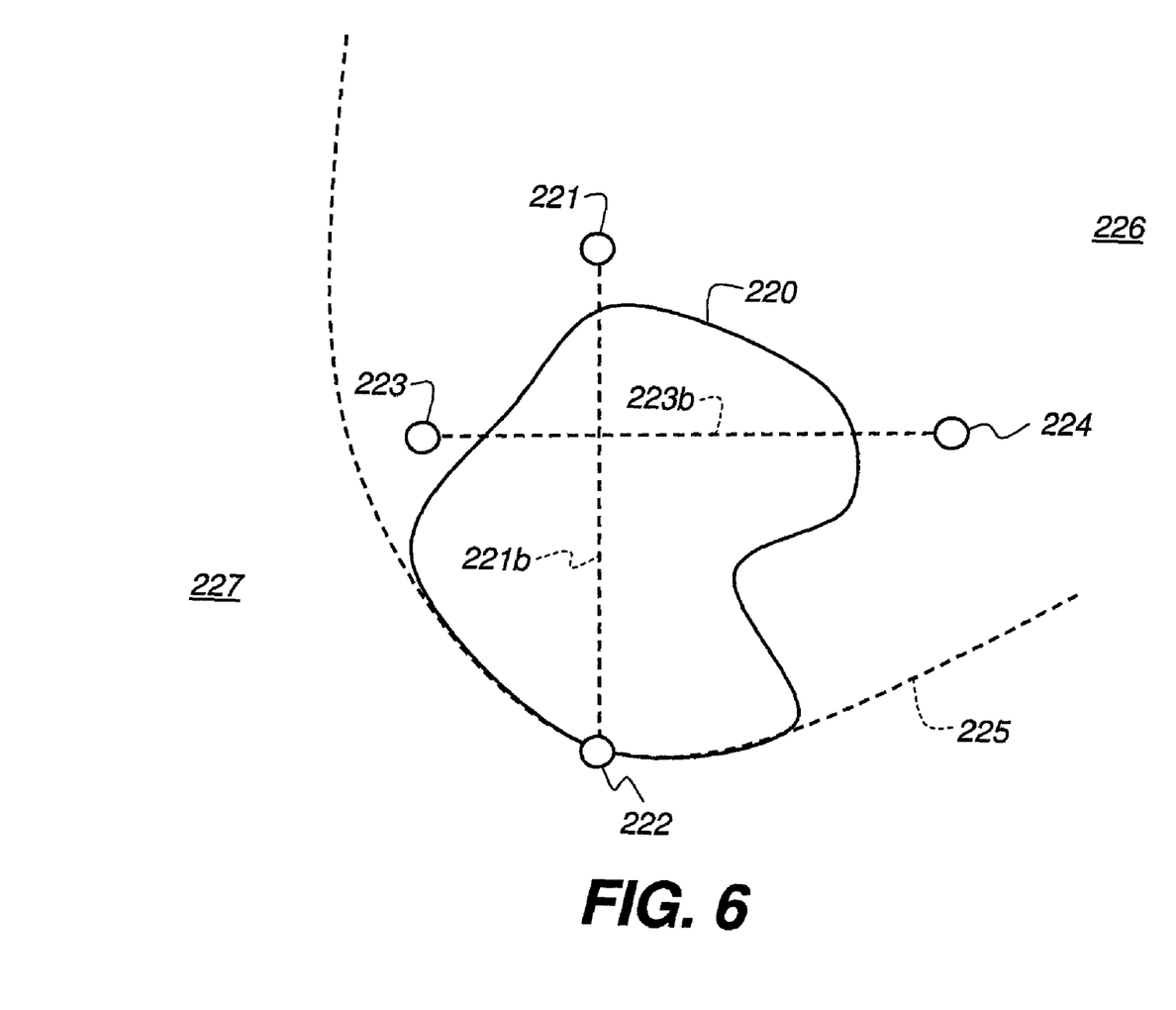
FIG. 6 is diagram that shows the selection of four points that span a lesion.

In practicing the present invention, the user of the system can draw a second set of two points in the same manner as the first set of two selected points as described above. FIG. 6 depicts a lesion 220 as the anatomical region or object of interest. Points 221 and 222 represent a first pair of selected points and points 223 and 224 represent a second pair of points. Lines 221b and 223b represent lines drawn between the respective pairs of selected points. Both sets of points span the lesion region. Curve 225 represents the boundary between lung parenchyma tissue 226 and mediastinal region 227. Points 223, 224, and 221 are located outside the lesion region 220, i.e. in the region of the lung parenchyma tissue 226. Selected point 222 lies on the boundary between lesion tissue 220 and mediastinal tissue 227.

Figure 7:
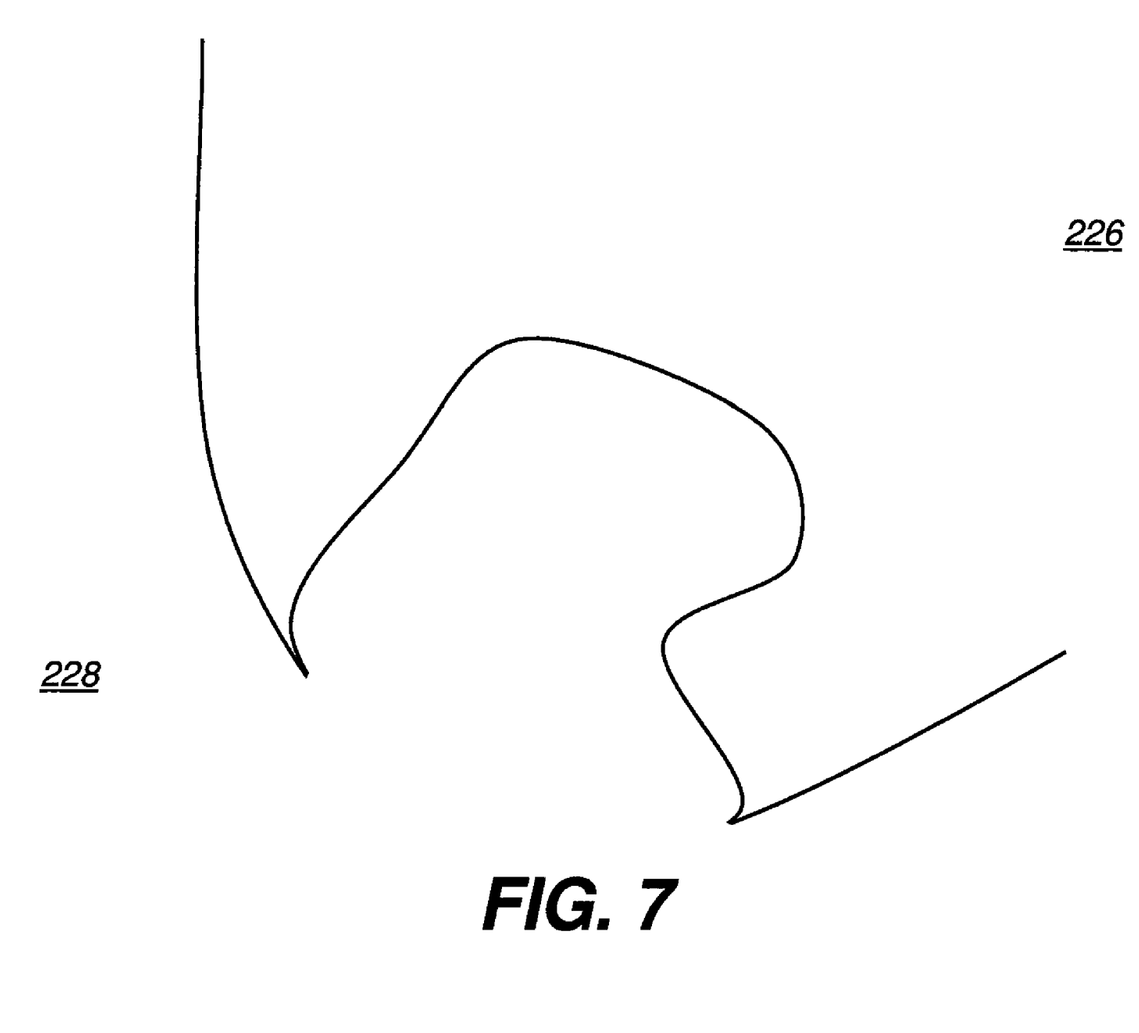
FIG. 7 is diagram that shows the results produced by a first segmentation processing step.

For the example shown in FIG. 6, the mediastinal tissue 227 and lesion tissue 220 are not differentiated by a change in voxel value. For many real world clinical applications there may be no visible boundary between a lesion and surrounding solid tissue. The radiologist using the PACS knows from experience how to construct a boundary line between the two different tissue types. The results of the first segmentation process, as described above, will be a combination of lesion region 220 and mediastinal region 227 as shown as segmentation region 228 in FIG. 7.

Figure 8:
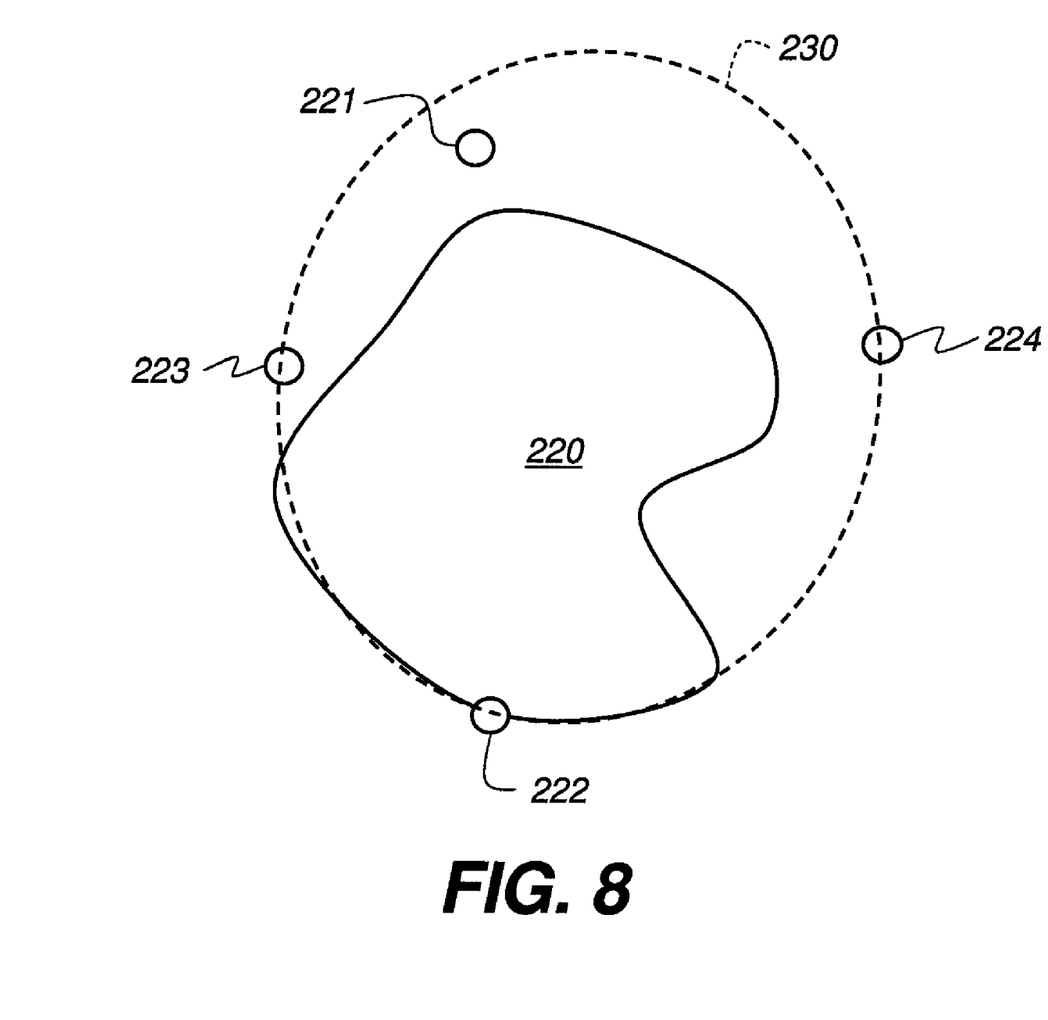
FIG. 8 is diagram that shows the geometry of a constructed bounding surface.

FIG. 8 illustrates a bounding surface 230. Points 223, 224, and 222 lie on the bounding surface, and point 221 lies within bounding surface 230. In an exemplary embodiment, the bounding surface 230 may be constructed by finding the minimum area ellipse that bounds all selected points. Mathematically, three points define an ellipse in a plane. With the addition of a fourth point, there is no guarantee that an ellipse passing through all four points can be found. However, an ellipse of minimum area can be found that includes, or bounds, all four points.

Figure 9:
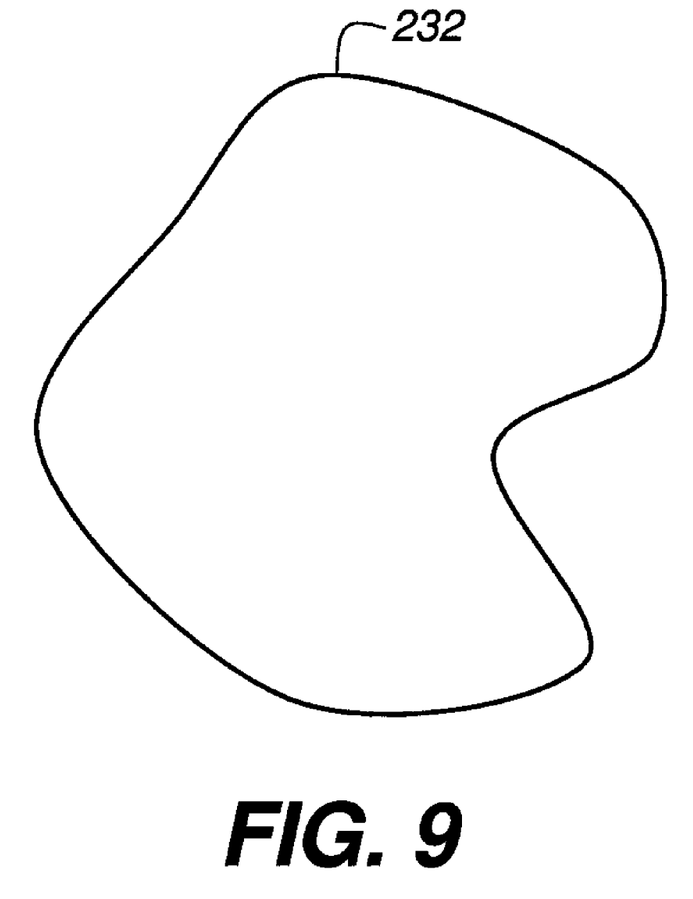
FIG. 9 is diagram that shows a final segmentation result.

The bounding surface 230 shown in FIG. 8 can be used to exclude voxels in the first segmentation result (shown in FIG. 7) that lie outside the bounding surface. The final segmentation result is shown in FIG. 9 as segmentation region 232 which approximates the true region of the lesion anatomy. Embodiments of the present disclosure can be applied to 2-dimensional regions of interest. To perform 3-dimensional segmentations, the bounding surface 230 shown in FIG. 8. as an ellipse in cross-section can be revolved about its major or minor axis to form an ellipsoid of revolution. The generated ellipsoid can be used as the bounding surface for 3-dimensional image segmentation.

The lines drawn between selected points need not be orthogonal to one another. Referring to FIG. 6, line 221b and line 223b do not have to be perpendicular or even approximately perpendicular. It is also not a requirement that the two line segments intersect. However, experimentation with clinical CT exams has revealed that users may instinctively choose pairs of points that result in corresponding lines segments that intersect.

It is convenient for the user to select pairs of points from the same planar slice of voxel data. For example, the points 221, 222, 223, and 224 shown in FIG. 6 could be selected from an axial, coronal, sagittal, or multiplanar reconstructed slice. However, coplanarity is not a requirement for obtaining acceptable results. For example, the user could select each point from a different slice if desired.

In an exemplary embodiment, the corresponding line segments for a given pair of points may follow the RECIST guidelines. For example, the first selected pair of points may be located along the longest axis of the anatomical region of interest and the second pair of points span the lesion in the widest portion. The third segment may also follow the RECIST criterion with regard to the longest axis as shown in the coronal or sagittal slice. The identification of particular slice orientations may reflect the preference in using axial slices for diagnosis, however, in an exemplary embodiment, the selected lines only need the affine hull of their respective and collective end points to be all of $\Re^3$.

Lesions and other anatomical regions or objects of interest in human bodies may be three dimensional. In an alternative embodiment, the user can supply an additional pair of points selected from an orthogonal view of the same CT voxel data. For example, if the two pairs of points were initially selected from an axial CT slice, the third pair of points may be selected in similar fashion from either a coronal or sagittal slice.

The selection of a third pair of selected points taken from an orthogonal slice view ensures that the six selected points are not coplanar. An ellipsoid bounding these six points may be generated and used as a bounding surface.

The equation of an ellipsoid may be constructed from the three pairs of points, i.e. points 221 and 222 as the first pair, points 223 and 224 as the second pair (shown in FIG. 6), and points 235 and 236 (not shown) taken from a coronal slice.

The affine hull of the points span all of $\Re^3$, equivalently, the six points are in general position. There are an infinite number of ellipsoids that contain the six selected points. However, there is a unique ellipsoid that contains all 6 points with minimal volume. The algorithmic approach to construct the minimal ellipsoid volume is the well-known Khachiyan algorithm.

Many anatomical regions of interest have an overall ellipsoidal shape. Even in the cases where diseased tissue's morphology is irregular, an ellipsoid often encapsulates the tissue efficiently. By using an ellipsoid rather than a rectilinear volume as the volume of interest, there will likely be fewer voxels in the volume, and that in turn reduces the potential number of voxels that need to be evaluated by a segmentation algorithm. If the radiologist could easily describe an ellipsoid that encapsulates the lesion, then the segmentation algorithm could use ellipsoid as a volume of interest to limit the extent of any region-growing algorithm.

An ellipsoid is mathematically defined as the locus of points satisfying the expression $(x-c)^t A(x-c)=1$, where x is a vector, c is the center of the ellipsoid, and A is a positive definite symmetric matrix. In the case of CT and MRI data, it is assumed that the vectors are so-called 3-vectors, i.e., points in a three-dimensional space. Consequently, A is a 3×3 matrix.

Given a set of 3-vectors, that are not co-planar, it may be of interest to determine an ellipsoid that contains all of the 3-vectors, but is minimal in volume. This is accomplished using the Khachiyan algorithm, a convex optimization method, (see Peng Sun and Robert M. Freund, "Computation of Minimum-Volume Covering Ellipsoids," Operations Research, vol. 52, No. 5, September-October 2004, pp. 690-706).

The algorithm is based upon well-known properties of positive definite matrices, such as the determinant of a positive symmetric matrix is positive. If the ellipsoid $E=\{v \in \Re^3 | (v-c)^t A(v-c) \leq 1\}$, then the volume of E scales with $\det(A)^{-1/2}$. If a set of vectors $\{a_i | i=1, \ldots, n\}$ is selected, then the desired matrix has the property that it has largest determinant and all the vectors in the set are in the ellipsoid. It is known that the set of positive symmetric matrices is a convex set, and that the function $-\log(\det(A))$ is a convex function on this set. A solution may be obtained by minimizing this function over the set of positive symmetric matrices while having the set of selected vectors contained in the corresponding ellipsoid. The solution is a method known in the field of convex optimization and a unique matrix exists, though for practical purposes an approximate solution can be found by an iterative approach.

Using the results from the convex optimization, a seed point for the subsequent segmentation algorithm can be obtained with one of a plurality of possible strategies. An exemplary method of the present disclosure may use the center of the ellipsoid as the seed point. In many cases this is adequate, as the user naturally will select line segments that straddling the lesion. An additional exemplary method may sample a collection of voxels about the ellipsoid center. Since the subsequent segmentation algorithm may identify those voxel within a lesion, and the Hounsfield units of a lesion may typically be in the range of approximately −450 through approximately −150, those voxels within the range are collected and a voxel as close as possible to the center of the ellipsoid and centered in that range of Hounsfield units is selected as the seed point. This procedure ensures that the seed point is part of the lesion, and is centrally positioned according to data supplied by the user. Of course other strategies and be envisioned easily.

The CAM segmentation software then identifies voxels surrounding and contiguous with the seed point that are part of the pulmonary lesion. When the segmentation algorithm is considering whether a voxel is to be included in the segmented region, the voxel must also pass a test to determine that the voxel is within the ellipsoid. The previously mentioned test accomplishes this task. This test prevents the segmentation algorithm from unconstrained growth, especially into regions of healthy tissue that share Hounsfield values of diseased tissue. Since boundaries between healthy and diseased tissue that are intuitive to the human observer tend to be smooth, the use of an ellipsoid as the volume of interest naturally enables such boundaries to be implemented. Once the region associated with the pulmonary lesion has been segmented a corresponding volumetric size can be calculated.

It is common practice in imaging processing to collect statistical information from image data prior to the application of an image processing algorithm. Typically, image data is sampled within a designated area of a 2-dimensional image or a volume or area of a 3-dimensional image. If the application is interactive, the user can guide the location of the sampling area by selecting a region of interest. Statistical information is then sampled from the region of interest that is a sub-volume of the entire CT image data set.

As discussed above, embodiments of the present disclosure use two selected points, supplied by the user of a PACS through a GUI, to indicate the location of a lesion as an anatomical region of interest. The algorithm technology then samples image data along a path, in the simplest case a line defined by the two selected points. This procedure is repeated for multiple pairs of selected points thus providing points that span the anatomical region in three dimensions. The segmentation results obtained from sampling statistics from points along the line provide sufficient statistics for the intended clinical applications. Additionally, points sampled along a line generated from two points that span a lesion tend to be more related to the identified lesion. For example, points could be sampled from a rectangular region defined by two selected points but the sampling region could contain much non-lesion tissue data.

Exemplary embodiments of the present disclosure combine the tasks of selecting points for the collection of statistical information along paths joining the selected points and defining a bounding surface for limiting the segmentation processing all in one operation. The combination of these two distinct operations may save operators of a PACS time. It is true that supplying the multiple points in the GUI takes more time than just supplying one click point as is commonly done. However, radiologists are accustomed to supplying a small number of multiple points when they use the RECIST guidelines for measuring the size of lesions. Typically, the software implementation takes a second to five seconds to segment lesions. During this time the radiologist is waiting for the segmentation results. The extra time that it takes for the radiologist to supply a few extra points does not detract from the overall time for the lesion evaluation task.

An advantage of embodiments of the present disclosure stems from the uniqueness of the application scenario. In known segmentation methods, the only statistical information known with certainty is that a click point is within the lesion and, therefore, is a representative value of the lesion tissue. In contrast, in embodiments of the present disclosure, it is known with certainty that the two selected points span the anatomical region of interest. Thus, the methods described herein take unique advantage of a priori knowledge to reliably sample statistical information from the image data that lies between the two selected points.

While the present disclosure includes descriptions of various preferred embodiments, it should be understood by those having skill in the art that the descriptions herein are merely exemplary and that various changes may be made and equivalents may be substituted for elements thereof without departing from the scope of the invention. Therefore, it is intended that the invention not be limited to the best mode of carrying out this invention or to the particular embodiments disclosed herein, but that the invention will include all embodiments falling within the scope and spirit of the appended claims.

PARTS LIST 10a image capture device
10b image capture device
42a electronic display device
42b electronic display device
44a input control device
44b input control device
60 mobile computer
110 communications network
120 diagnostic workstation computer
140 image archive computer
150 software application program
201 lesion region
202 selected point
203 selected point
204 background region
205 line
206 selected point
206b boundary point
207 selected point
207b boundary point
208 line
210 line
211 point
212 lesion region
213 background region
214 selected point
215 selected point
220 lesion region
221 point
221b line
222 point
223 point
223b line
224 point
225 curve
226 background region
227 mediastinal region
228 segmentation region
230 bounding surface
232 segmentation region
235 point
236 point

The invention claimed is:

1. A method of bounding an anatomical object of interest in a 3-dimensional volume image, the method executed at least in part on a computer, comprising:
    displaying an image of at least a portion of the anatomical object of interest;
    selecting a plurality of points in the displayed image, at least a first point and a second point of the plurality of points spanning the anatomical object of interest;
    forming a non-rectilinear surface bounding the plurality of points;
    identifying a seed point within the anatomical object of interest within the non-rectilinear surface and evaluating image voxels disposed proximate the seed point and obtaining one or more statistical values from the evaluated proximate voxels; and
    classifying image voxels within the non-rectilinear surface into a first class and a second class based on the one or more obtained statistical values.

2. The method of claim 1, wherein the non-rectilinear surface is one of spherical and elliptical.

3. The method of claim 1, wherein the seed point is located based on the first and second points, located at a midpoint along a path between the first and second points or proximate a portion of the path.

4. The method of claim 1, wherein the non-rectilinear surface is centered about the seed point, where the image is a 2-dimensional image or a 3-dimensional image derived from the 3-dimensional volume image.

5. The method of claim 1, wherein the plurality of points further includes a third point and a fourth point, the third and fourth points spanning the anatomical object of interest.

6. The method of claim 5, wherein at least three of the first, second, third, and fourth points lie on the non-rectilinear surface.

7. The method of claim 5, wherein at least three of the first, second, third, and fourth points are coplanar.

8. The method of claim 5, wherein a line segment connecting the first and second points approximates a maximum length of the anatomical object of interest, and a line segment connecting the third and fourth points approximates a maximum width of the anatomical object of interest.

9. The method of claim 5, wherein the plurality of points further includes a fifth point and a sixth point, the fifth and sixth points spanning the anatomical object of interest.

10. The method of claim 1, further including applying a noise filtering algorithm, using the computer, to a plurality of voxel values associated with the image voxels within the non-rectilinear surface, wherein the one or more obtained statistical values are extracted from the noise-filtered voxel values.

11. The method of claim 10, further including classifying the image voxels within the non-rectilinear surface into the first and second classes based on the set of noise-filtered voxel values.

12. A method of bounding an anatomical object of interest in a 3-dimensional volume image, the method executed at least in part on a computer, comprising:
    displaying an image of at least a portion of the anatomical object of interest;
    selecting a first pair of points and second pair of points in the displayed image, both the first pair of points and the second pair of points spanning the anatomical object of interest;
    forming an ellipsoid bounding the first pair of points and the second pair of points;
    identifying a seed point within the anatomical object of interest and evaluating image voxels disposed proximate the seed point and obtaining one or more statistical values from the evaluated proximate voxels; and
    classifying image voxels within the ellipsoid into a first class and a second class based on the one or more statistical values.

13. The method of claim 12, wherein the ellipsoid is an ellipsoid of revolution.

14. The method of claim 12, further including selecting a third pair of points in the displayed image, the third pair spanning the anatomical object of interest.

15. The method of claim 14, wherein the ellipsoid is a minimal volume ellipsoid containing the first, second, and third pairs of points.

16. The method of claim 14, wherein at least one pair of the first, second, and third pairs of points lies in a different plane than the remaining pairs of points.

17. The method of claim 14, comprising:
determining a first line segment connecting the first pair of points that approximates a maximum length of the anatomical object of interest,
determining a second line segment connecting the second pair of points that approximates a maximum width of the anatomical object of interest, and
determining a third line segment connecting the third pair of points that approximates a maximum height of the anatomical object of interest.

18. The method of claim 12, wherein classifying the image voxels within the ellipsoid comprises comparing image voxel values corresponding to the image voxels within the ellipsoid to a mean statistical value.

19. A method of bounding an anatomical object of interest in a 3-dimensional volume image, the method executed at least in part on a computer, comprising:
displaying an image of at least a portion of the object;
selecting a first pair of points and a second pair of points in the displayed image, each of the first pair and the second pair spanning the object;
forming a minimum area ellipse bounding the first pair and the second pair in response to the selection of the first pair and the second pair;
identifying a seed point within the ellipse based on one pair of points and evaluating voxels disposed proximate the seed point and obtaining a plurality of statistical values from the evaluated proximate voxels; and
classifying voxels within the ellipse into a first class and a second class based on the plurality of statistical values.

20. The method of claim 19, wherein the anatomical object of interest comprises a lesion.

* * * * *